US012668741B2

(12) United States Patent
Sakai et al.

(10) Patent No.: US 12,668,741 B2
(45) Date of Patent: Jun. 30, 2026

(54) EUROPIUM ACTIVATING BETA-TYPE SIALON PHOSPHOR, AND LIGHT-EMITTING DEVICE

(71) Applicant: Denka Company Limited, Tokyo (JP)

(72) Inventors: Noriyoshi Sakai, Tokyo (JP); Ryousuke Kondo, Tokyo (JP); Tomohiro Nomiyama, Tokyo (JP); Keita Kobayashi, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 621 days.

(21) Appl. No.: 18/024,932

(22) PCT Filed: Sep. 6, 2021

(86) PCT No.: PCT/JP2021/032708
§ 371 (c)(1),
(2) Date: Mar. 6, 2023

(87) PCT Pub. No.: WO2022/054764
PCT Pub. Date: Mar. 17, 2022

(65) Prior Publication Data
US 2024/0026221 A1      Jan. 25, 2024

(30) Foreign Application Priority Data

Sep. 10, 2020    (JP) ................................. 2020-152024
Sep. 10, 2020    (JP) ................................. 2020-152026
Sep. 10, 2020    (JP) ................................. 2020-152027

(51) Int. Cl.
C09K 11/77          (2006.01)
C09K 11/08          (2006.01)
C09K 11/64          (2006.01)

(52) U.S. Cl.
CPC ........ C09K 11/7728 (2013.01); C09K 11/641 (2013.01)

(58) Field of Classification Search
CPC ..... C09K 11/0883; C09K 11/67; C09K 11/77; C09K 11/77066; C09K 11/77067; C09K 11/77347; C09K 11/77348; C09K 11/7734; H10H 20/85; H10H 20/8512
See application file for complete search history.

(56) References Cited

U.S. PATENT DOCUMENTS

| | | | |
|---|---|---|---|
| 2006/0061263 A1 | 3/2006 | Sakuma et al. | |
| 2011/0248303 A1* | 10/2011 | Suzuki | C09K 11/7729 252/301.4 F |
| 2012/0306356 A1 | 12/2012 | Yoon et al. | |
| 2013/0153824 A1 | 6/2013 | Fujinaga et al. | |
| 2013/0188333 A1 | 7/2013 | Ooya et al. | |
| 2014/0376259 A1* | 12/2014 | Choi | G02B 6/0023 313/503 |
| 2024/0026221 A1 | 1/2024 | Sakai et al. | |

FOREIGN PATENT DOCUMENTS

| | | |
|---|---|---|
| CN | 1906269 A | 1/2007 |
| CN | 103080635 A | 5/2013 |
| CN | 106281317 A | 1/2017 |
| JP | 2005-008794 A | 1/2005 |
| JP | 2012-064327 A | 3/2012 |
| JP | 2012-077288 A | 4/2012 |
| JP | 2012-087289 A | 5/2012 |
| JP | 2013-519750 A | 5/2013 |
| JP | 2016-028126 A | 2/2016 |
| JP | 2017-002278 A | 1/2017 |
| KR | 10-2013-0017067 A | 2/2013 |
| KR | 102800018 B1 | 4/2025 |
| TW | 201713749 A | 4/2017 |
| WO | 2010/143590 A1 | 12/2010 |
| WO | 2011/099800 A2 | 8/2011 |
| WO | 2012/023414 A1 | 2/2012 |
| WO | 2013/105345 A1 | 7/2013 |
| WO | 2013/105346 A1 | 7/2013 |

OTHER PUBLICATIONS

Mar. 7, 2023 International Preliminary Report on Patentability issued in International Patent Application No. PCT/JP2021/032708.
Wang et al., "Influence of different aid-sintering additives on the green-emitting Beta-SiAlON:Eu2+ phosphors," RSC Advances, 2017, pp. 32982-32988, vol. 7.
Nov. 22, 2021, International Search Report issued in International Application No. PCT/JP2021/032708.

* cited by examiner

*Primary Examiner* — Matthew E. Hoban
*Assistant Examiner* — Lynne Edmondson
(74) *Attorney, Agent, or Firm* — Oliff PLC

(57) ABSTRACT

An europium activating β-type sialon phosphor contains at least one kind of element selected from the group made of yttrium, titanium, and gadolinium, wherein the total content of the at least one kind of element is more than 0 ppm and less than 1000 ppm.

13 Claims, No Drawings

EUROPIUM ACTIVATING BETA-TYPE SIALON PHOSPHOR, AND LIGHT-EMITTING DEVICE

TECHNICAL FIELD

The present disclosure relates to a europium activating β-type sialon phosphor, and a light-emitting device.

BACKGROUND ART

Oxynitride phosphors are known as phosphors in which a decrease in luminance due to temperature rising is small and which is excellent in durability. Among the oxynitride phosphors, europium activating β-type sialon is known as a green phosphor that can be excited by ultraviolet light, a visible light beam, or the like.

For example, the β-type sialon phosphor is obtained by heating a raw material mixture containing a silicon nitride powder, an aluminum nitride powder, and a europium oxide powder in a nitrogen atmosphere. Among examinations for practical activation of the β-type sialon phosphor, an examination for improving luminous efficiency has also been made (for example, Patent Literature 1).

In addition, an examination for improving light-emission luminance has also been made. For example, Patent Literature 2 discloses a method of manufacturing a β sialon phosphor. The method includes a first heat treatment step of subjecting a mixture containing an aluminum compound, a first europium compound, and silicon nitride to a heat treatment to obtain a first heat-treated product, and a second heat treatment step of subjecting the first heat-treated product and a second europium compound to a heat treatment in a rare gas atmosphere to obtain a second heat-treated product. In addition, Patent Literature 3 discloses a method of manufacturing β-type sialon phosphor. The method includes a firing step of firing a raw material mixture of the β-type sialon phosphor at a temperature of 1820° C. to 2200° C. in a nitrogen atmosphere to obtain a sintered product, and an annealing step of annealing the sintered product at a temperature of 1100° C. or higher in a reducing atmosphere.

CITATION LIST

Patent Literature

Patent Literature 1: Japanese Unexamined Patent Publication No. 2013-519750
Patent Literature 2: Japanese Unexamined Patent Publication No. 2017-002278
Patent Literature 3: International Publication WO 2010/143590

SUMMARY OF INVENTION

Technical Problem

An object of the present disclosure is to provide a europium activating β-type sialon phosphor excellent in internal quantum efficiency.

Solution to Problem

According to an aspect of the present disclosure, there is provided a europium activating β-type sialon phosphor containing at least one kind of element selected from the group consisting of yttrium, titanium, and gadolinium, wherein the total content of the at least one kind of element is more than 0 ppm and less than 1000 ppm.

The europium activating β-type sialon contains the above-described element in a predetermined amount, and thus internal quantum efficiency is excellent.

The at least one kind of element may be yttrium, the at least one kind of element may be titanium, or the at least one kind of element may be yttrium and titanium. The europium activating β-type sialon phosphor contains yttrium or titanium in a predetermined amount, and thus the internal quantum efficiency is more excellent.

The at least one kind of element may include at least one of yttrium and titanium, and the total content of yttrium and titanium may be 0.1 to 500 ppm. When the total content of yttrium and titanium is within the above-described range, a crystal defect of the phosphor can be further reduced, and thus the internal quantum efficiency is more excellent.

The at least one kind of element may include at least one of yttrium and titanium, and an absorptance with respect to excitation light with a wavelength of 600 nm may be 5% or less.

The at least one kind of element may be gadolinium. Since the europium activating β-type sialon phosphor contains gadolinium in a predetermined amount, the internal quantum efficiency is more excellent.

The content of gadolinium may be 0.1 to 300 ppm. When the content of gadolinium is within the above-described range, the crystal defect of phosphor can be further reduced, and thus the internal quantum efficiency is more excellent.

In the europium activating β-type sialon phosphor in which the at least one kind of element is gadolinium, an absorptance with respect to excitation light with a wavelength of 600 nm may be 6% or less.

According to another aspect of the present disclosure, there is provided a europium activating β-type sialon phosphor containing an alkaline earth metal element, wherein the total content of the alkaline earth metal element is more than 0 ppm and less than 1000 ppm.

Since the europium activating β-type sialon phosphor contains the alkaline earth metal element in a predetermined amount, the internal quantum efficiency is excellent.

The alkaline earth metal element may be magnesium or strontium. When magnesium or strontium is contained, the crystal defect of the phosphor can be further reduced, and thus the internal quantum efficiency is more excellent.

The total content of the alkaline earth metal element may be 0.1 to 500 ppm. When the content of the alkaline earth metal element is within the above-described range, the crystal defect of the phosphor can be further reduced, and thus the internal quantum efficiency is more excellent.

In the europium activating β-type sialon phosphor containing the alkaline earth metal element, an absorptance with respect to excitation light with a wavelength of 600 nm may be 7% or less.

According to still another aspect of the present disclosure, there is provided a light-emitting device including: a light-emitting element that emits primary light; and a wavelength converting body that absorbs a part of the primary light and emits secondary light with a wavelength longer than the wavelength of the primary light, wherein the wavelength converting body contains the above-described europium activating (S-type sialon phosphor.

Since the light-emitting device contains the above-described europium activating β-type sialon phosphor as the wavelength converting body, luminous efficiency is excellent.

Advantageous Effects of Invention

According to the present disclosure, it is possible to provide a europium activating β-type sialon phosphor excellent in internal quantum efficiency.

DESCRIPTION OF EMBODIMENTS

Hereinafter, an embodiment of the present disclosure will be described. However, the following embodiment is an example for explaining the present disclosure, and the present disclosure is not intended to be limited by the following contents.

With regard to materials exemplified in this specification, one kind may be used alone or two or more kinds can be used in combination unless otherwise stated. With regard to the content of each component in a composition, in a case where a plurality of materials corresponding to the component in the composition exist, the content represents the total amount of the plurality of materials existing in the composition unless otherwise stated. Each of "steps" in this specification may be independent steps or may be steps which are performed simultaneously.

An embodiment of a europium activating β-type sialon phosphor contains at least one kind of element selected from the group consisting of yttrium, titanium, and gadolinium. The europium activating β-type sialon phosphor may contain, for example, one kind or two kinds of elements selected from the group consisting of yttrium, titanium, and gadolinium among the above-described elements, or may contain one kind of element selected from the group consisting of yttrium, titanium, and gadolinium. For example, the above-described at least one kind of element may be yttrium, may be titanium, or may be gadolinium. In a case where the europium activating β-type sialon phosphor contains two kinds among the above-described elements, the above-described at least one kind of element may be yttrium and titanium. For example, the europium activating β-type sialon phosphor may be a phosphor containing yttrium, may be a phosphor containing titanium, or may be a phosphor containing yttrium and titanium. That is, the europium activating β-type sialon phosphor may contain at least one of yttrium and titanium. The europium activating β-type sialon phosphor may be a phosphor that further contains gadolinium.

The europium activating β-type sialon phosphor may include a β-type sialon as a main crystal, or may be composed of the β-type sialon. The europium activating β-type sialon phosphor may contain a different phase in a range not damaging the gist of the present disclosure. The europium activating β-type sialon phosphor may have a composition expressed by a compositional formula of $Si_{6-z}Al_zO_zN_{8-z}$:Eu. In the compositional formula, z may satisfy a relationship of 0.0<z≤4.2, or a relationship of 0.0<z≤0.5. The composition of the europium activating β-type sialon phosphor can be adjusted by changing a component and a composition ratio of a raw material composition when manufacturing the phosphor.

In the composition of the europium activating β-type sialon phosphor according to this embodiment, the content of nitrogen atoms (N) and oxygen atoms (O) can be quantified by an oxygen/nitrogen analyzer, and the content of europium (Eu), silicon (Si), aluminum (Al), yttrium (Y), titanium (Ti), and gadolinium (Gd) can be confirmed by performing quantitative analysis of elements by using an ICP emission spectrophotometer.

In the europium activating β-type sialon phosphor, the total content of the at least one kind of element is more than 0 ppm and less than 1000 ppm. The total content of the least one kind of element can be adjusted in accordance with the kind of the above-described elements contained in the europium activating β-type sialon phosphor.

The total content of yttrium and titanium is more than 0 ppm and less than 1000 ppm on the basis of the total amount of the europium activating β-type sialon phosphor. The europium activating β-type sialon phosphor according to this embodiment is excellent in internal quantum efficiency, and the present inventors assume the reason why this effect is obtained as follows. Specifically, in the europium activating β-type sialon phosphor according to this embodiment, it is assumed that vacancies which occur during manufacturing of the phosphor and become defects in the phosphor are filled with yttrium or titanium ions, and thus the defects are reduced and the internal quantum efficiency become excellent.

For example, a lower limit value of the content of yttrium may be ppm or more, or 0.2 ppm or more on the basis of the total amount of the europium activating β-type sialon phosphor. When the lower limit value of the content of yttrium is within the above-described range, the internal quantum efficiency of the europium activating β-type sialon phosphor can be further improved. For example, an upper limit value of the content of yttrium may be 800 ppm or less, 600 ppm or less, or 500 ppm or less on the basis of the total amount of the europium activating β-type sialon phosphor. When the upper limit value of the content of yttrium is within the above-described range, occurrence of a different phase derived from excessively added yttrium is suppressed, and generation of a non-light-emitting component can be suppressed, and thus deterioration of light emission characteristics of the europium activating β-type sialon phosphor can be suppressed. The content of yttrium may be adjusted within the above-described range, or may be, for example, to 900 ppm or 0.1 to 500 ppm on the basis of the total amount of the europium activating β-type sialon phosphor.

For example, a lower limit value of the content of titanium may be 0.1 ppm or more or 0.2 ppm or more on the basis of the total amount of the europium activating β-type sialon phosphor. When the lower limit value of the content of titanium is within the above-described range, the internal quantum efficiency of the europium activating β-type sialon phosphor can be further improved. For example, an upper limit value of the content of titanium may be 800 ppm or less, 600 ppm or less, or 500 ppm or less on the basis of the total amount of the europium activating β-type sialon phosphor. When the upper limit value of the content of titanium is within the above-described range, occurrence of a different phase derived from excessively added titanium is suppressed, and generation of a non-light-emitting component can be suppressed, and thus deterioration of light emission characteristics of the europium activating β-type sialon phosphor can be suppressed. The content of titanium may be adjusted within the above-described range, or may be, for example, 0.1 to 900 ppm or 0.1 to 500 ppm on the basis of the total amount of the europium activating β-type sialon phosphor.

For example, a lower limit value of the total content of yttrium and titanium may be 0.1 ppm or more, or 0.2 ppm or more on the basis of the total amount of the europium activating β-type sialon phosphor. When the lower limit value of the total content of yttrium and titanium is within the above-described range, the internal quantum efficiency of the europium activating β-type sialon phosphor can be further improved. For example, an upper limit value of the total content of yttrium and titanium may be 800 ppm or less, 600 ppm or less, or 500 ppm or less on the basis of the total amount of the europium activating β-type sialon phosphor. When the upper limit value of the total content of yttrium and titanium is within the above-described range, occurrence of a different phase derived from excessively added yttrium and titanium elements is suppressed, and generation of a non-light-emitting component can be suppressed, and thus deterioration of light emission characteristics of the europium activating β-type sialon phosphor can be suppressed. The total content of yttrium and titanium may be adjusted within the above-described range, or may be, for example, 0.1 to 900 ppm or 0.1 to 500 ppm on the basis of the total amount of the europium activating β-type sialon phosphor.

The content of gadolinium is more than 0 ppm and less than 1000 ppm on the basis of the total amount of the europium activating β-type sialon phosphor. The europium activating β-type sialon phosphor according to this embodiment is excellent in the internal quantum efficiency, and the present inventors assume the reason why this effect is obtained as follows. That is, in the europium activating β-type sialon phosphor according to this embodiment, it is assumed that vacancies which occur during manufacturing of the phosphor and become defects in the phosphor are filled with gadolinium ions, and thus the defects are reduced and the internal quantum efficiency become excellent.

For example, a lower limit value of the content of gadolinium may be 0.1 ppm or more, or 0.2 ppm or more on the basis of the total amount of the europium activating β-type sialon phosphor. When the lower limit value of the content of gadolinium is within the above-described range, the internal quantum efficiency of the europium activating β-type sialon phosphor can be further improved. For example, an upper limit value of the content of gadolinium may be 800 ppm or less, 600 ppm or less, 500 ppm or less, or 300 ppm or less on the basis of the total amount of the europium activating β-type sialon phosphor. When the upper limit value of the content of gadolinium is within the above-described range, occurrence of a different phase derived from excessively added gadolinium is suppressed, and generation of a non-light-emitting component can be suppressed, and thus deterioration of light emission characteristics of the europium activating β-type sialon phosphor can be suppressed. The content of gadolinium may be adjusted within the above-described range, or may be, for example, 0.1 to 900 ppm, 0.1 to 500 ppm, or 0.1 to 300 ppm on the basis of the total amount of the europium activating β-type sialon phosphor.

Another embodiment of the europium activating β-type sialon phosphor contains an alkaline earth metal element. The europium activating β-type sialon phosphor may contain β-type sialon as a main crystal or may be composed of β-type sialon. The europium activating β-type sialon phosphor may contain a different phase within a range not damaging the gist of the present disclosure. The europium activating β-type sialon phosphor may have a composition expressed by a compositional formula of $Si_{6-z}Al_zO_zN_{8-z}$: Eu. In the compositional formula, z may satisfy a relationship of $0.0 < z \leq 4.2$, or a relationship of $0.0 < z \leq 0.5$. The composition of the europium activating β-type sialon phosphor can be adjusted by changing a component and a composition ratio of a raw material composition when manufacturing the phosphor.

In the composition of the europium activating β-type sialon phosphor according to this embodiment, the content of the alkaline earth metal element such as magnesium (Mg) and strontium (Sr) can be confirmed by performing quantitative analysis of an element by using an ICP emission spectrophotometer.

Alkaline earth metals may be metals known as Group II elements in periodic table published by IUPAC. As the alkaline earth metal elements, for example, at least one selected from the group consisting of magnesium, calcium, strontium, and barium may be contained, and magnesium or strontium is preferably contained.

The total content of the alkaline earth metal elements is more than ppm and less than 1000 ppm on the basis of the total amount of the europium activating β-type sialon phosphor. The europium activating β-type sialon phosphor according to this embodiment is excellent in the internal quantum efficiency, and the present inventors assume the reason why this effect is obtained as follows. Specifically, in the europium activating β-type sialon phosphor according to this embodiment, it is assumed that vacancies which occur during manufacturing of the phosphor and become defects in the phosphor are filled with ions of elements pertaining to alkaline earth metals, and thus the defects are reduced and the internal quantum efficiency become excellent.

For example, a lower limit value of the total content of the alkaline earth metal elements may be 0.1 ppm or more, or 0.2 ppm or more on the basis of the total amount of the europium activating β-type sialon phosphor. When the lower limit value of the total content of the alkaline earth metal elements is within the above-described range, the internal quantum efficiency of the europium activating β-type sialon phosphor can be further improved. For example, an upper limit value of the total content of the alkaline earth metal elements may be 800 ppm or less, 600 ppm or less, 500 ppm or less, or 300 ppm or less on the basis of the total amount of the total amount of the europium activating β-type sialon phosphor. When the upper limit value of the total content of the alkaline earth metal elements is within the above-described range, occurrence of a different phase derived from excessively added alkaline earth metal elements is suppressed, and generation of a non-light-emitting component can be suppressed, and thus deterioration of light emission characteristics of the europium activating β-type sialon phosphor can be suppressed. The total content of alkaline earth metal elements may be adjusted within the above-described range, or may be, for example, 0.1 to 900 ppm, 0.1 to 500 ppm, or 0.1 to 300 ppm on the basis of the total amount of the europium activating β-type sialon phosphor.

A 50% cumulative diameter (D50) in a volume basis cumulative particle size distribution of the europium activating β-type sialon phosphor according to the present disclosure may be adjusted in correspondence with applications of the phosphor, or the like. For example, the 50% cumulative diameter (D50) in the volume basis cumulative particle size distribution of the europium activating β-type sialon phosphor may be 0.1 to 50 μm, 3 to 40 μm, or 6 to 30 μm. For example, D50 can be controlled by adjusting conditions such as a heating temperature, heating time, or the like when manufacturing the phosphor, by classification, or the like.

D50 in this specification represents a particle size when an integrated value from a small particle size reaches 50% of the total in a distribution curve of volume basis particle sizes measured by a laser diffraction/scattering method. The distribution curve relating to the particle size of the phosphor is performed in conformity to a particle size distribution measurement method by a laser diffraction/scattering method described in JIS R 1629:1997 "Determination of particle size distributions for fine ceramic raw powders by laser diffraction/scattering method". In the measurement, a particle size distribution measuring device can be used. Specifically, first, 0.1 g of phosphor that is a measurement target is put into 100 mL of ion-exchanged water, a small amount of sodium hexametaphosphate is added to the resultant mixture, and the mixture is subjected to a dispersion treatment for 3 minutes by using an ultrasonic homogenizer to obtain a measurement sample. With respect to the measurement sample, a particle size distribution is measured by using the particle size distribution measuring device, and D50 is determined from an obtained particle size distribution. D50 is referred to as a median diameter, and represents an average particle size of target particles. Note that, as the particle size distribution measuring device, for example, "Microtrac MT3300EX II" (product name) manufactured by Microtrac Bell Co., Ltd. As the ultrasonic homogenizer, for example, "Ultrasonic Homogenizer US-150E" (product name, chip size: $\phi$20, amplitude: 100%, oscillation frequency: 19.5 KHz, and amplitude: approximately 31 μm) manufactured by NIHONSEIKI KAISHA LTD. can be used.

In the europium activating β-type sialon phosphor according to the present disclosure, an absorptance with respect to light with a wavelength of 600 nm is suppressed. Absorption of europium in the phosphor with respect to the light with a wavelength of 600 nm is small, and an influence of fluorescence generated from the phosphor is small in the wavelength. Accordingly, in a case where the absorptance with respect to the light with a wavelength of 600 nm is high, it is considered that the absorption is caused by defects or a different phase that is a non-light-emitting component. In the europium activating β-type sialon phosphor according to the present disclosure, for example, an absorptance with respect to excitation light with a wavelength of 600 nm can be set to 7% or less, 6.8% or less, 6.0% or less, 5.0% or less, 4.8% or less, 4.5% or less, or 4.0% or less. In the europium activating β-type sialon phosphor, since the absorptance with respect to the excitation light with a wavelength of 600 nm is suppressed, and an influence of defects or a different phase that is a non-light-emitting component is small, the internal quantum efficiency can be more excellent.

In a case where the europium activating β-type sialon phosphor contains at least one of yttrium and titanium, for example, the absorptance with respect to light with a wavelength of 600 nm can be set to 5.0% or less, 4.8% or less, 4.5% or less, or 4.0% or less. In a case where the europium activating β-type sialon phosphor contains gadolinium, for example, the absorptance with respect to light with a wavelength of 600 nm can be set to 6.0% or less, 5.5% or less, or 5% or less.

In a case where the europium activating β-type sialon phosphor contains an alkaline earth metal element, for example, the absorptance with respect to light with a wavelength of 600 nm can be set to 7% or less, 6% or less, or 5% or less.

The europium activating β-type sialon phosphor according to the present disclosure is excellent in the internal quantum efficiency, and for example, the internal quantum efficiency can be set to more than 80%, 81% or more, 82% or more, 83% or more, or 84% or more.

The absorptance of light and the internal quantum efficiency in this specification represent quantum efficiency obtained in a case of exciting the phosphor by using near-ultraviolet light with a wavelength of 455 nm unless otherwise stated. Specifically, the internal quantum efficiency is obtained by a method described in examples of this specification.

For example, the europium activating β-type sialon phosphor according to the present disclosure can be manufactured by the following method. An example of a method of manufacturing the europium activating β-type sialon phosphor may be a method including a sintering step of obtaining a sintered body containing β-type sialon from a raw material composition that contains a silicon source, an aluminum source, and a europium source, and contains at least one kind among the sources as a nitride by one or more heating treatments, and an annealing step of obtaining an annealed body from a mixture that includes the sintered body, and at least one among a supply source of at least one kind of element selected from the group consisting of yttrium, titanium, and gadolinium, an alkaline earth metal elementary substance, and a compound including an alkaline earth metal element as a constituent element by one or more annealing treatments in an atmosphere containing at least one kind selected from the group consisting of a rare gas, a reducing gas, and an inert gas. Examples of the supply source of the at least one kind of element selected from the group consisting of yttrium, titanium, and gadolinium include at least one kind selected from the group consisting of an yttrium elementary substance, a titanium elementary substance, a compound including yttrium as a constituent element, and a compound including titanium as a constituent element, at least one kind of a gadolinium elementary substance and a compound including gadolinium as a constituent element, and the like. Hereinafter, this example will be described.

The raw material composition includes a compound including an element that becomes a constituent element of europium activating β-type sialon, and contains at least a silicon source, an aluminum source, and a europium source. In the raw material composition, at least one kind of the silicon source, the aluminum source, and the europium source is a nitride. The nitride includes nitrogen that becomes a constituent element of the europium activating β-type sialon, and thus the nitride is also a nitrogen source.

The silicon source represents a compound in which silicon is set as a constituent element or an elementary substance, the aluminum source represents a compound in which aluminum is set as a constituent element or an elementary substance, and the europium source represents a compound in which europium is set as a constituent element or an elementary substance. In this specification, the compound in which silicon is set as a constituent element is also referred to as a silicon compound, the compound in which aluminum is set as a constituent element is also referred to as an aluminum compound, and the compound in which europium is set as a constituent element is also referred to as a europium compound.

Each of the silicon compound, the aluminum compound, and the europium compound may be any one among a nitride, an oxide, an oxynitride, and a hydroxide. In addition, the raw material composition may further contain β-type sialon or europium activating β-type sialon. Here, the β-type sialon or the europium activating β-type sialon is a material that becomes an aggregate or a core.

Examples of the silicon compound include a silicon nitride ($Si_3N_4$), a silicon oxide ($SiO_2$), and the like. As the silicon nitride, silicon nitride with a high α fraction is preferably used. For example, the α fraction of the silicon nitride may be 80% by mass or more, 90% by mass or more, or 95% by mass or more. When the α fraction of silicon nitride is within the above-described range, primary grain growth can be promoted. As the silicon nitride, silicon nitride with a small oxygen content is preferably used. For example, the oxygen content in the silicon nitride may be 3.0% by mass or less, or 1.3% by mass or less. When the oxygen content in the silicon nitride is within the above-described range, occurrence of defects in a β-type sialon crystal can be suppressed.

Examples of the aluminum compound include aluminum nitride (AlN), aluminum oxide ($Al_2O_3$), and an aluminum hydroxide ($Al(OH)_3$), and the like.

Examples of the europium compound include oxides of europium (europium oxide), nitrides of europium (europium nitride), halides of europium, and the like. Examples of the halides of europium include europium fluoride, europium chloride, europium bromide, and europium iodide, and the like. The europium compound preferably includes europium oxide. The valence of europium in the europium compound may be divalent or trivalent, and preferably divalent.

The raw material mixture can be prepared by weighing and mixing respective compounds. In mixing, a dry mixing method or a wet mixing method may be used. For example, the dry mixing method may be a method in which respective components are mixed by using a V-type mixer or the like. For example, the wet mixing method may be a method in which a solvent such as water or a dispersion medium is added to prepare a solution or a slurry, and respective components are mixed, and then the solvent or the dispersion medium is removed.

For example, the heating temperature in the sintering step may be 1800° C. to 2500° C., 1800° C. to 2400° C., 1850° C. to 2100° C., 1900° C. to 2100° C., 1900° C. to 2050° C., or 1920° C. to 2050° C. When the heating temperature in the sintering step is set to 1800° C. or higher, grain growth of the β-type sialon is promoted, and a solid-solution amount of europium can be made more sufficient. When the heating temperature in the sintering step is set to 2500° C. or lower, decomposition of β-type sialon crystals can be sufficiently suppressed.

The heating time in the sintering step may be long from the viewpoint of promoting primary grain growth of the β-type sialon, but when the heating time is excessively long, crystal defects may increase, and thus the heating time may be, for example, 1 to 30 hours, 3 to 25 hours, or 5 to 20 hours.

For example, heating of the raw material mixture in the sintering step may be performed in a nitrogen atmosphere. When performing heating under a high nitrogen partial pressure condition, decomposition of silicon nitride at a high temperature can be suppressed. In addition, when being treated at a high temperature, grain growth can be promoted. For example, heating of the raw material mixture in the sintering step may be performed under pressure. For example, the pressure at this time may be 0.01 to 200 MPaG, 0.02 to 200 MPaG, 0.1 to 200 MPaG, 0.1 to 100 MPaG, 0.1 to 50 MPaG, 0.1 to 15 MPaG, or 0.1 to 5 MPaG.

The number of times of the heating treatment in the sintering step may be once, but may be, for example, two or more times, two to five times, or two to four times. When performing a heat treatment a plurality of times, a europium activating β-type sialon phosphor having more excellent light emission intensity can be obtained.

In the sintering step, one or more heating treatments are performed, but when performing the heat treatment a plurality of times, heat treatments are sequentially referred to as a first heat treatment, a second heat treatment, and the like, and steps of performing respective heating treatments may be sequentially referred to as a first sintering step, a second sintering step, and the like. For example, in the above-described manufacturing method, when the heating treatment is performed twice in the sintering step, the sintering step includes a step of subjecting the raw material composition containing a nitride to a first heating treatment to obtain a first heated body, and a second sintering step of subjecting the first heated body to a second heating treatment to obtain a second heated body. In addition, in this case, the second heated body corresponds to a sintered body containing the β-type sialon. Before performing the heating treatment a plurality of times, the silicon source, the heating treatment may be performed after further mixing the aluminum source, and the europium source.

In a case where two or more heating treatments are performed in the sintering step as a heating temperature, heating time, an atmosphere during heating, and a pressure during heating in the first sintering step, the heating temperature, the heating time, the atmosphere during heating, and the pressure during heating in the above-described heating step are applicable, respectively. In addition, a heating temperature, heating time, an atmosphere during heating, and a pressure during heating in a step subsequent to the second sintering step may be the same as or different from those in the first sintering step. However, even in a case where the heating temperature, the heating time, the atmosphere during heating, and the pressure during heating in a step subsequent to the second sintering step are different from those in the first sintering step, the heating temperature, the heating time, the atmosphere, and the pressure are set within the range of the conditions shown with regard to the above-described heating step.

The sintered body obtained in the sintering step is a solid solution that has a β-type sialon crystal, and an element serving as a light-emitting center is solid-saluted at a part of the crystal, and the sintered body itself can emit fluorescence. The sintered body obtained in the sintering step may be lumpy, and thus a grain size may be adjusted by crushing or the like prior to the annealing step.

Next, the annealing step will be described. The annealing step in the manufacturing method in this example represents a step of obtaining an annealed body from a mixture including the sintered body obtained in the above-described sintering step, and at least one among a supply source of at least one kind of element selected from the group consisting of yttrium, titanium, and gadolinium, an alkaline earth metal elementary substance, and a compound including an alkaline earth metal element as a constituent element. For example, the above-described step may be a step of annealing a mixture including the sintered body obtained in the above-described sintering step, and at least one kind selected from the group consisting of an yttrium elementary substance, a titanium elementary substance, a compound including yttrium as a constituent element, and a compound including titanium as a constituent element, a step of annealing a mixture including the sintered body obtained in the above-described sintering step, and at least one between a gadolinium elementary substance and a compound including gadolinium as a constituent element, or a step of annealing a mixture including the sintering body obtained in the above-described sintering step, and at least one between an alkaline earth metal elementary substance, and a compound including an alkaline earth metal element as a constituent element. In the annealing step, an annealed body is obtained from the mixture by one or more heating treatments.

For example, the compound including yttrium as a constituent element and the compound including titanium as a constituent element may be an oxide, a nitride, a hydroxide, or the like, and is preferably an oxide. For example, the compound including yttrium as a constituent element and the compound including titanium as a constituent element may be an yttrium oxide ($Y_2O_3$), a titanium oxide ($Ti_2O_3$), or the like.

For example, the total blending amount of the yttrium elementary substance, the titanium elementary substance, the compound including yttrium as a constituent element, and the compound including titanium as a constituent element may be 0.01% by mass to 4% by mass, 0.05% by mass to 3% by mass, or 0.1% by mass to 3% by mass with respect to the total amount of the mixture. When the blending amount is set to 0.01% by mass or more, at least one of yttrium and titanium can be easily introduced into the phosphor, and the internal quantum efficiency of the obtained europium activating β-type sialon phosphor can be further improved. When the blending amount is set to 4% by mass or less, deterioration of light emission characteristics of the obtained europium activating β-type sialon phosphor can be suppressed.

For example, the compound including gadolinium as a constituent element may be an oxide, a nitride, a hydroxide, or the like, and is preferably an oxide. For example, the compound including gadolinium as a constituent element may be a gadolinium oxide ($Gd_2O_3$), or the like.

For example, the total blending amount of the gadolinium elementary substance and the compound including gadolinium as a constituent element may be 0.01% by mass to 4% by mass, 0.05% by mass to 3% by mass, or 0.1% by mass to 3% by mass with respect to the total amount of the mixture. When the total blending amount of the gadolinium elementary substance and the compound including gadolinium as a constituent element is set to 0.01% by mass or more, it is easy to introduce gadolinium into the phosphor, and it is possible to further improve the internal quantum efficiency of the europium activating β-type sialon phosphor that is obtained. When the total blending amount of the gadolinium elementary substance and the compound including gadolinium as a constituent element is set to 4% by mass or less, a different phase derived from excessively added gadolinium is suppressed, and deterioration of light emission characteristics of the obtained europium activating β-type sialon phosphor can be suppressed.

Examples of the compound including the alkaline earth metal element as a constituent element include an oxide, a carbonate, a nitride, a hydroxide, and the like, and is preferably the oxide or the carbonate. The alkaline earth metal element may be the alkaline earth metal element that is exemplified as a constituent element of the europium activating β-type sialon phosphor. For example, the compound including the alkaline earth metal element as a constituent element may be a magnesium oxide (MgO), a strontium carbonate ($SrCO_3$), a strontium nitride ($Sr_2N_3$), a strontium oxide (SrO), or the like.

For example, the total blending amount of the alkaline earth metal elementary substance, and the compound including the alkaline earth metal element as a constituent element may be 0.01% by mass to 4% by mass, 0.05% by mass to 3% by mass, 0.1% by mass to 3% by mass, or by mass to 1.5% by mass with respect to the total amount of the mixture. When the total blending amount of the alkaline earth metal elementary substance and the compound including the alkaline earth metal element as a constituent element is set to 0.01% by mass or more, it is easy to introduce the alkaline earth metal element into the phosphor, and it is possible to further improve the internal quantum efficiency of the europium activating β-type sialon phosphor that is obtained.

When the total blending amount of the alkaline earth metal elementary substance and the compound including the alkaline earth metal element as a constituent element is set to 4% by mass or less, a different phase derived from excessively added alkaline earth metal element is suppressed, and deterioration of light emission characteristics of the obtained europium activating β-type sialon phosphor can be suppressed.

In the annealing step, the annealing treatment is performed in an atmosphere including at least one kind selected from the group consisting of a rare gas, a reducing gas, and an inert gas. When annealing treatment is performed in the atmosphere including the rare gas, the reducing gas, or the inert gas, a ratio of divalent europium in europium in a solid solution can be raised.

For example, the rare gas may contain argon, helium, and the like, may contain argon, or may be composed of argon. For example, the reducing gas may contain ammonia, hydrocarbon, carbon monoxide, hydrogen, and the like, may contain hydrogen, or may be composed of hydrogen. For example, the inert gas may contain nitrogen and the like, or may be composed of nitrogen. The atmosphere in the annealing step may be a mixed gas of two or more kinds among the rare gas, the reducing gas, and the inert gas. In a case where the atmosphere in the annealing step is set to the mixed gas, for example, the content of the reducing gas may be 1% by volume to 50% by volume, or 4% by volume to 20% by volume on the basis of the total volume of the mixed gas. For example, the content of the inert gas may be 1% by volume to 50% by volume or 4% by volume to 20% by volume on the basis of the total volume of the mixed gas.

A pressure in the annealing treatment may be the same as the pressure in the sintering step, but preferably lower than the pressure condition in the sintering step, and more preferably the atmospheric pressure.

It is necessary for an annealing treatment temperature to be set to be lower than the heating temperature in the sintering step. For example, an upper limit value of the annealing treatment temperature may be 1700° C. or lower, or 1680° C. or lower. When the upper limit value of the annealing treatment temperature is set within the above-described range, it is possible to suppress progress of further grain growth within the sintered body, aggregation between solid solutions, formation of secondary grains, and the like, and coarsening of grains. For example, a lower limit value of the annealing treatment temperature may be 1000° C. or higher, 1100° C. or higher, 1200° C. or higher, 1300° C. or higher, or 1400° C. or higher. When the lower limit value of the annealing treatment temperature is set within the above-described range, a crystal defect density of the β-type sialon included in the annealed body is reduced, and the internal quantum efficiency can be further improved. The annealing treatment temperature can be adjusted within the above-described range, and may be, for example, 1000° C. to 1700° C., or 1100° C. to 1680° C.

For example, heating time in the annealing treatment may be 1 to hours, 2 to 25 hours, or 3 to 20 hours from the viewpoint of further reducing crystal defects in the phosphor included in the annealed body.

In the annealing step, one or more annealing treatments are performed, but when performing the annealing treatment a plurality of times, annealing treatments are sequentially referred to as a first annealing treatment, a second annealing treatment, and the like, and steps of performing respective annealing treatments may be sequentially referred to as a first annealing step, a second annealing step, and the like. For example, in the above-described manufacturing method, when performing the annealing treatment twice in the annealing step, the annealing step includes a step of subjecting the sintered body to a first annealing treatment to obtain a first annealed body, and a second annealing step of subjecting the first annealed body to a second annealing treatment to obtain a second annealed body. In addition, in this case, the second annealed body corresponds to the above-described annealed body.

In the annealing step, in a case where two or more annealing treatments are performed, as an annealing treatment temperature, heating time, and a pressure during heating in a first annealing step, the annealing temperature, the heating time, and the pressure during heating in the above-described annealing step are applicable, respectively. In addition, a heating temperature, heating time, and a pressure during heating in an annealing treatment subsequent to the second annealing step may be the same as or different from those in the first annealing step. However, even in a case where the annealing treatment temperature, the heating time, and the pressure during heating a step subsequent to the second annealing step are different from those in the first annealing step, the heating temperature, the heating time, and the pressure during heating are set within the range of the conditions shown with regard to the above-described annealing step.

The number of times of the annealing treatment in the annealing step may be once, but may be, for example, two or more times, two to five times, or two to four times. When performing the annealing treatment a plurality of times, the crystal defect density of the β-type sialon included in the annealed body is reduced, and a europium activating β-type sialon phosphor that is more excellent in the internal quantum efficiency can be obtained.

In a case of performing the annealing treatment a plurality of times in the annealing step, at least one among the supply source of at least one kind of element selected from the group consisting of yttrium, titanium, and gadolinium (for example, the yttrium elementary substance, the titanium elementary substance, the compound including yttrium as a constituent element, the compound including titanium as a constituent element, the gadolinium elementary substance, the compound including gadolinium as a constituent element, or the like), the alkaline earth metal elementary substance, and the compound including an alkaline earth metal element as a constituent element may be blended at once in the first annealing step, or may be blended in a plurality of times of annealing steps in a divided manner, but is preferably blended at once in the first annealing step. Note that, in a case of blending the compound and the like in a divided manner, with regard to description relating to the total blending amount of at least one among the supply source of at least one kind of element selected from the group consisting of yttrium, titanium, and gadolinium, the alkaline earth metal elementary substance, and the compound including an alkaline earth metal element as a constituent element, it is assumed that the total blending amount is replaced with the total amount of at least one among the supply source of at least one kind of element selected from the group consisting of yttrium, titanium, and gadolinium, the alkaline earth metal elementary substance, and the compound including an alkaline earth metal element as a constituent element to be blended in a plurality of annealing steps in application.

The method of manufacturing the europium activating β-type sialon phosphor may include other steps in addition to the sintering step and the annealing step. As the other steps, for example, a step of treating the annealed body obtained in the annealing step with at least any one of an acid and an alkali, a classification step of adjusting a particle size of the annealed body or an annealed body subjected to an acid treatment or the like, and the like can be provided. The step of treating the annealed body with an acid is referred to as an acid treatment step, and a step of treating the annealed body with an alkali is referred to as an alkali treatment step.

For example, the crystal defect density in the phosphor included in the annealed body is further reduced by the acid treatment step or the alkali treatment step, silicon that is generated due to thermal decomposition of the β-type sialon or the like and exists a solid solution surface can be removed, and AlN-polytypoid that is a pseudo polymorph of aluminum nitride (AlN) that is by-produced at the time of manufacturing of the first sintered body, or the like can be removed. For example, the acid may include hydrofluoric acid, nitric acid, and the like. The acid may be a mixed acid of the hydrofluoric acid and the nitric acid. For example, the alkali may include sodium hydroxide, and the like.

For example, the classification step may be performed either a wet classification method or dry classification method. Examples of the wet classification method include a levigation classification method in which the annealed body is added into a mixed solvent containing ion-exchanged water and a dispersant (for example, sodium hexametaphosphate, or the like), or a mixed solvent containing ion-exchanged water and ammonia water, and the resultant solution is stirred and is left still to remove particles having a small particle size, and the like.

The europium activating β-type sialon phosphor according to the present disclosure may be used alone, or can be used in combination with other phosphors. The europium activating β-type sialon phosphor according to the present disclosure is excellent in the internal quantum efficiency, and thus can be preferably used in a light-emitting device such as an LED. The phosphor can be used in a state of being dispersed in a cured resin. The cured resin is not particularly limited, and for example, a resin or the like that is used as a sealing resin, of such as a light-emitting device, can be used.

An embodiment of the light-emitting device is a light-emitting device including a light-emitting element that emits primary light, and a wavelength converting body that absorbs a part of the primary light and emits secondary light with a wavelength longer than a wavelength of the primary light. The wavelength converting body contains the above-described europium activating β-type sialon phosphor. For example, the light-emitting element that emits primary light may be an InGaN blue LED, or the like. The light-emitting element and the wavelength converting body may be dispersed in the sealing resin or the like.

Hereinbefore, several embodiments have been described, but the present disclosure is not limited to the above-described embodiments. In addition, the descriptions relating to the above-described embodiments can be applied to each other.

EXAMPLES

Hereinafter, the content of the present disclosure will be described in more detail with reference to examples and comparative examples. However, the present disclosure is not limited to the following examples.

Comparative Example I-1

[Preparation of Europium Activating β-Type Sialon Phosphor]

Respective raw materials were weighed and contained in a container so that silicon nitride ($Si_3N_4$) becomes 96.0% by mass, aluminum nitride (AlN) becomes 2.8% by mass, aluminum oxide ($Al_2O_3$) becomes 0.5% by mass, and europium oxide ($Eu_2O_3$) becomes 0.7% by mass, and the raw materials were mixed by a V-type mixer (manufactured by Tsutsui Scientific Instruments Co., Ltd.) to obtain a mixture. The obtained mixture was caused to pass through a sieve with a mesh size of 250 μm to remove aggregates, thereby obtaining a raw material composition. The aggregates which did not pass through the sieve were pulverized and were caused to pass through the sieve to adjust a particle size.

200 g of raw material composition prepared as described above was weighed and contained in a cylindrical boron nitride container with a lid (manufactured by Denka Company Limited, a molded product containing a boron nitride as a main component (product name: Denka Boron Nitride N-1), inner diameter: 10 cm, height: 10 cm). Then, the container was placed in an electric furnace provided with a carbon heater, a temperature was raised to 2020° C. in a nitrogen gas atmosphere (pressure: 0.90 MPaG), and heating was performed for eight hours at a heating temperature of 2020° C. (sintering step). After heating, a sample that becomes a loosely aggregated lump in the container was crushed by using a mortar. After crushing, the crushed sample was caused to pass through a sieve with a mesh size of 250 μm, thereby obtaining a first sintered body having a powder shape.

Next, a cylindrical boron nitride container was filled with the first sintered body, and the container was placed in an electric furnace provided with a carbon heater. A temperature was raised to 1450° C. in an argon gas atmosphere (pressure: 0.025 MPaG), and heating was performed for three hours at a heating temperature of 1450° C. (annealing step). After heating, a lump in which particles are loosely aggregated in the container was crushed by using a mortar, and the resultant crushed objects were caused to pass through a sieve having an opening of 250 μm, thereby obtaining a powder.

Next, the obtained powder was added to a mixed acid (obtained by mixing hydrofluoric acid and nitric acid in a volume ratio of 1:1) of hydrofluoric acid (concentration: 50% by mass) and nitric acid (concentration: 70% by mass), the resultant solution was subjected to an acid treatment for 30 minutes while being stirred at a temperature of 75° C. After the acid treatment, stirring was terminated and the powder was allowed to precipitate, thereby removing a supernatant and a fine powder refined with the acid treatment. Then, distilled water was further added to the powder, and stirring was performed again. The stirring was terminated and a powder was allowed to precipitate and a supernatant and a fine powder were removed. This operation was repeated until pH of the aqueous solution is 8 or less and the supernatant becomes transparent, and the resultant precipitate was filtered and dried, thereby obtaining a europium activating β-type sialon phosphor.

Comparative Example I-2

A europium activating β-type sialon phosphor was obtained in a similar manner as in Comparative Example I-1 except that the atmosphere in the annealing step was changed from the argon gas atmosphere to a hydrogen gas atmosphere, and the treatment temperature in the annealing step within the electric furnace provided with a metal heater was changed to 1650° C.

Example I-1

A europium activating β-type sialon phosphor was obtained in a similar manner as in Comparative Example I-2 except that in the annealing step, the mixture was adjusted so that the blending amount of the yttrium oxide becomes 0.1% by mass with respect to the total amount of the first sintered body and the yttrium oxide, that is, 100% by mass, and then the mixture was heated in a hydrogen gas atmosphere.

Example I-2

A europium activating β-type sialon phosphor was obtained in a similar manner as in Example I-1 except that the blending amount of the yttrium oxide was changed to 0.5% by mass.

Example I-3

A europium activating β-type sialon phosphor was obtained in a similar manner as in Example I-1 except that the blending amount of the yttrium oxide was changed to 1% by mass.

Comparative Example I-3

A europium activating β-type sialon phosphor was obtained in a similar manner as in Example I-1 except that the blending amount of the yttrium oxide was changed to 5% by mass.

Example I-4

A europium activating β-type sialon phosphor was obtained in a similar manner as in Comparative Example I-1 except that in the annealing step, the mixture was adjusted so that the blending amount of the yttrium oxide becomes 0.5% by mass with respect to the total amount of the first sintered body and the yttrium oxide, that is, 100% by mass, and then the mixture was heated in an argon gas atmosphere.

Example I-5

A europium activating β-type sialon phosphor was obtained in a similar manner as in Comparative Example I-1 except that in the annealing step, the mixture was adjusted so that the blending amount of the titanium oxide becomes 0.1% by mass with respect to the total amount of the first sintered body and the titanium oxide, that is, 100% by mass, and then the mixture was heated in an argon gas atmosphere.

Example I-6

A europium activating β-type sialon phosphor was obtained in a similar manner as in Example I-5 except that the blending amount of the titanium oxide was changed to 0.5% by mass.

Example I-7

A europium activating β-type sialon phosphor was obtained in a similar manner as in Example I-5 except that the blending amount of the titanium oxide was changed to 1% by mass.

Comparative Example I-4

A europium activating β-type sialon phosphor was obtained in a similar manner as in Example I-5 except that the blending amount of the titanium oxide was changed to 5% by mass.

Comparative Example I-5

A europium activating β-type sialon phosphor was obtained in a similar manner as in Comparative Example I-1 except that in the annealing step, the mixture was adjusted so that the blending amount of the zirconium oxide becomes 0.1% by mass with respect to the total amount of the first sintered body and the zirconium oxide, that is, 100% by mass, and then the mixture was heated in an argon gas atmosphere.

Comparative Example I-6

A europium activating β-type sialon phosphor was obtained in a similar manner as in Comparative Example I-5 except that the blending amount of the zirconium oxide was changed to 0.5% by mass.

Comparative Example I-7

A europium activating β-type sialon phosphor was obtained in a similar manner as in Comparative Example I-1 except that in the annealing step, the mixture was adjusted so that the blending amount of a zinc oxide becomes 0.1% by mass with respect to the total amount of the first sintered body and the zinc oxide, that is, 100% by mass, and then the mixture was heated in an argon gas atmosphere.

Comparative Example I-8

A europium activating β-type sialon phosphor was obtained in a similar manner as in Comparative Example I-7 except that the blending amount of the zinc oxide was changed to 0.5% by mass.

Comparative Example I-9

A standard sample of (manufactured by Sialon co., Ltd., NIMS Standard Green lot No. NSG 1301) of the β-type sialon phosphor was set as a phosphor of Comparative Example I-9.

<Measurement of Content of Each of Yttrium, Titanium, Zirconium, and Zinc>

With respect to the europium activating β-type sialon phosphors prepared in Examples I-1 to 1-7, and Comparative Examples I-1 to 1-8, the content of each of yttrium, titanium, zirconium, and zinc was measured as follows. Results are shown in Table 1.

<Contents of Yttrium, Titanium, Zirconium, and Zinc>

The content of yttrium, titanium, zirconium, and zinc in the europium activating β-type sialon phosphors were measured in the following order. Each of the phosphors was dissolved by a pressurized acid decomposition method, thereby preparing a sample solution. With respect to the obtained sample solution, quantitative analysis of elements was performed by using ICP emission spectrophotometer (manufactured by Rigaku Corporation, product name: CIROS-120). Note that, a detection lower limit of each of yttrium (Y), titanium (Ti), zirconium (Zr), and zinc (Zn) was 100 ppb.

[Evaluation of Europium Activating β-Type Sialon Phosphor]

With respect to each of the europium activating β-type sialon phosphors prepared in Examples I-1 to I-7, and Comparative Examples I-1 to I-9, an absorptance, internal quantum efficiency, external quantum efficiency, and chromaticity X in a case of irradiation with excitation light with a wavelength of 455 nm, and an absorptance in a case of irradiation with excitation light with a wavelength of 600 nm were evaluated by a method to be described later. Results are shown in Table 1.

<Absorptance, Internal Quantum Efficiency, and External Quantum Efficiency>

The absorptance (excitation light absorptance), the internal quantum efficiency, and the external quantum efficiency of the phosphor in a case of irradiation with excitation light with a wavelength of 455 nm were calculated in the following order. First, a phosphor that is a measurement target was filled in a concave cell in a smooth surface state, and was attached to an opening of an integrating sphere. Monochromatic light divided to a wavelength of 455 nm from an Xe lamp that is a light-emission light source was introduced into the integrating sphere as excitation light of the phosphor by using an optical fiber. The phosphor that is a measurement target was irradiated with the monochromatic light that is excitation light to measure a fluorescent spectrum. In the measurement, a spectrophotometer (manufactured by Otsuka Electronics Co., Ltd., product name: MCPD-7000) was used.

A light emission intensity of the phosphor was determined from obtained fluorescent spectrum data. In addition, the number of photons of reflected excitation light (Qref) and the number of photons of fluorescent light (Qem) were calculated from the obtained fluorescent spectrum data. The number of photons of the reflected excitation light was calculated in the same wavelength range as in the number of photons of excitation light, and the number of photons of fluorescent light was calculated in a range of 465 to 800 nm. In addition, a standard reflective plate (manufactured by Labsphere, Spectralon (registered trademark)) having a reflectance of 99% was attached to the opening of the integrating sphere by using the same device, and a spectrum of excitation light with a wavelength of 455 nm was measured. At this time, the number of photons of excitation light (Qex) was calculated from a spectrum in a wavelength range of 450 to 465 nm.

The absorptance, the internal quantum efficiency, and the external quantum efficiency of the phosphor that is a measurement target with respect to the excitation light with a wavelength of 455 nm were obtained from the above-described calculation results on the basis of the following calculation formulae.

$$\text{Absorptance of excitation light with a wavelength of } 455 \text{ nm} = ((Q_{ex} - Q_{ref})/Q_{ex}) \times 100$$

$$\text{Internal quantum efficiency} = (Q_{em}/(Q_{ex} - Q_{ref})) \times 100$$

$$\text{External quantum efficiency} = (Q_{em}/Q_{ex}) \times 100$$

Note that, from the formulae, a relational formula between the external quantum efficiency, the absorptance of the excitation light with a wavelength of 455 nm, and the internal quantum efficiency can be expressed as follows.

$$\text{External quantum efficiency} = \text{absorptance of light with a wavelength of 455 nm} \times \text{internal quantum efficiency}$$

<Chromaticity X>

The chromaticity X was obtained by calculating x value (chromaticity X) in CIE chromaticity coordinates in an XYZ colorimetric system defined by JIS Z8781-3:2016 from spectrum data of a fluorescent spectrum in a wavelength region within a range of 465 to 780 nm in conformity to JIS Z8724:2015.

<Absorptance of Light with Wavelength of 600 nm>

A standard reflective plate (manufactured by Labsphere, Spectralon (registered trademark)) having a reflectance of 99% was set to a side opening of the integrating sphere. Monochromatic light divided to a wavelength of 600 nm from a light-emission light source (Xe lamp) was introduced to the integrating sphere by an optical fiber, and a spectrum of reflected light was measured by a spectrophotometer (MCPD-7000 manufactured by Otsuka Electronics Co., Ltd.). At this time, the number of photons of incident light (Qex(600)) was calculated from a spectrum in a wavelength range of 590 to 610 nm.

Next, the β-type sialon phosphor was filled in a concave cell in a smooth surface state and was set to an opening of an integrating sphere, and then the phosphor was irradiated with monochromatic light with a wavelength of 600 nm, and a spectrum of reflected incident light was measured by a spectrophotometer. The number of photons of the reflected incident light (Qref(600)) was calculated from obtained spectrum data. The number of photons of the reflected incident light (Qref(600)) was calculated in the same wavelength range as in the number of photons of incident light (Qex(600)). An absorptance of light with a wavelength of 600 nm was calculated from the obtained two kinds of number of photons on the basis of the following formula.

$$\text{Absorptance of light with a wavelength of 600 nm} = ((Qex(600) - Qref(600))/Qex(600)) \times 100$$

Respective measurement values relating to the absorptance, the internal quantum efficiency, the external quantum efficiency, and the chromaticity X of the phosphor may fluctuate when a manufacturer of the measurement device, a manufacturing lot number, or the like is changed. Accordingly, as various measurement values, values measured by a measurement method described in this specification are employed. However, in a case where the manufacturer of the measurement device, the manufacturing lot number, or the like is changed, the respective measurement values may be necessary to be corrected by setting measurement values obtained for a standard sample of the β-type sialon phosphor as reference values. As the standard sample for obtaining the reference values, the standard sample of the β-type sialon phosphor exemplified in Comparative Example I-9 can be used.

TABLE 1

| | Conditions of annealing step | | | Phosphor Content of yttrium | Phosphor Content of titanium | Phosphor Content of zirconium | Phosphor Content of zinc |
|---|---|---|---|---|---|---|---|
| | Atmosphere | Additive | | [ppm] | [ppm] | [ppm] | [ppm] |
| Comparative Example I-1 | Ar | — | — | Equal to or less than detection lower limit | Equal to or less than detection lower limit | Equal to or less than detection lower limit | Equal to or less than detection lower limit |
| Comparative Example I-2 | H₂ | — | — | Equal to or less than detection lower limit | Equal to or less than detection lower limit | Equal to or less than detection lower limit | Equal to or less than detection lower limit |
| Example I-1 | H₂ | Y₂O₃ | 0.1 | 0.4 | Equal to or less than detection lower limit | Equal to or less than detection lower limit | Equal to or less than detection lower limit |
| Example I-2 | H₂ | Y₂O₃ | 0.5 | 0.8 | Equal to or less than detection lower limit | Equal to or less than detection lower limit | Equal to or less than detection lower limit |
| Example I-3 | H₂ | Y₂O₃ | 1 | 426.5 | Equal to or less than detection lower limit | Equal to or less than detection lower limit | Equal to or less than detection lower limit |
| Comparative Example I-3 | H₂ | Y₂O₃ | 5 | 3874.4 | Equal to or less than detection lower limit | Equal to or less than detection lower limit | Equal to or less than detection lower limit |
| Example I-4 | Ar | Y₂O₃ | 0.5 | 0.9 | Equal to or less than detection lower limit | Equal to or less than detection lower limit | Equal to or less than detection lower limit |
| Example I-5 | Ar | Ti₂O₃ | 0.1 | Equal to or less than detection lower limit | 0.5 | Equal to or less than detection lower limit | Equal to or less than detection lower limit |
| Example I-6 | Ar | Ti₂O₃ | 0.5 | Equal to or less than detection lower limit | 3.4 | Equal to or less than detection lower limit | Equal to or less than detection lower limit |
| Example I-7 | Ar | Ti₂O₃ | 1 | Equal to or less than detection lower limit | 327.7 | Equal to or less than detection lower limit | Equal to or less than detection lower limit |
| Comparative Example I-4 | Ar | Ti₂O₃ | 5 | Equal to or less than detection lower limit | 1782.3 | Equal to or less than detection lower limit | Equal to or less than detection lower limit |
| Comparative Example I-5 | Ar | ZrO₂ | 0.1 | Equal to or less than detection lower limit | Equal to or less than detection lower limit | 5.6 | Equal to or less than detection lower limit |
| Comparative Example I-6 | Ar | ZrO₂ | 0.5 | Equal to or less than detection lower limit | Equal to or less than detection lower limit | 20.1 | Equal to or less than detection lower limit |
| Comparative Example I-7 | Ar | ZnO | 0.1 | Equal to or less than detection lower limit | Equal to or less than detection lower limit | Equal to or less than detection lower limit | 12.5 |
| Comparative Example I-8 | Ar | ZnO | 0.5 | Equal to or less than detection lower limit | Equal to or less than detection lower limit | Equal to or less than detection lower limit | 45.2 |
| Comparative Example I-9 | — | — | — | Equal to or less than detection lower limit | Equal to or less than detection lower limit | Equal to or less than detection lower limit | Equal to or less than detection lower limit |

TABLE 1-continued

| | | Evaluation | | | |
|---|---|---|---|---|---|
| | | Wavelength of excitation light: 455 nm | | | Wavelength of excitation light: 600 nm |
| | Absorptance [%] | Internal quantum efficiency [%] | External quantum efficiency [%] | Chromaticity X | Absorptance [%] |
| Comparative Example I-1 | 81 | 78 | 63 | 0.373 | 7.0 |
| Comparative Example I-2 | 82 | 78 | 64 | 0.373 | 7.2 |
| Example I-1 | 82 | 85 | 70 | 0.377 | 4.4 |
| Example I-2 | 81 | 84 | 68 | 0.375 | 3.3 |
| Example I-3 | 80 | 79 | 64 | 0.369 | 4.9 |
| Comparative Example I-3 | 76 | 72 | 55 | 0.365 | 8.5 |
| Example I-4 | 81 | 82 | 66 | 0.378 | 4.5 |
| Example I-5 | 80 | 81 | 65 | 0.380 | 4.2 |
| Example I-6 | 81 | 82 | 67 | 0.379 | 3.9 |
| Example I-7 | 80 | 81 | 65 | 0.379 | 4.1 |
| Comparative Example I-4 | 78 | 73 | 57 | 0.367 | 8.2 |
| Comparative Example I-5 | 82 | 78 | 64 | 0.378 | 7.6 |
| Comparative Example I-6 | 81 | 75 | 61 | 0.375 | 7.6 |
| Comparative Example I-7 | 81 | 78 | 63 | 0.377 | 5.6 |
| Comparative Example I-8 | 80 | 78 | 62 | 0.376 | 4.5 |
| Comparative Example I-9 | 74 | 75 | 56 | 0.356 | 7.6 |

Comparative Example II-1

[Preparation of Europium Activating β-Type Sialon Phosphor]

Respective raw materials were weighed and contained in a container so that silicon nitride ($Si_3N_4$) becomes 96.0% by mass, aluminum nitride (AlN) becomes 2.8% by mass, aluminum oxide ($Al_2O_3$) becomes 0.5% by mass, and europium oxide ($Eu_2O_3$) becomes 0.7% by mass, and the raw materials were mixed by a V-type mixer (manufactured by Tsutsui Scientific Instruments Co., Ltd.) to obtain a mixture. The obtained mixture was caused to pass through a sieve with a mesh size of 250 μm to remove aggregates, thereby obtaining a raw material composition. The aggregates which did not pass through the sieve were pulverized and were caused to pass through the sieve to adjust a particle size.

200 g of raw material composition prepared as described above was weighed and contained in a cylindrical boron nitride container with a lid (manufactured by Denka Company Limited, a molded product containing a boron nitride as a main component (product name: Denka Boron Nitride N-1), inner diameter: 10 cm, height: 10 cm). Then, the container was placed in an electric furnace provided with a carbon heater, a temperature was raised to 2020° C. in a nitrogen gas atmosphere (pressure: 0.90 MPaG), and heating was performed for eight hours at a heating temperature of 2020° C. (sintering step). After heating, a sample that becomes a loosely aggregated lump in the container was crushed by using a mortar. After crushing, the crushed sample was caused to pass through a sieve with a mesh size of 250 μm, thereby obtaining a first sintered body having a powder shape.

Next, a cylindrical boron nitride container was filled with the first sintered body, and the container was placed in an electric furnace provided with a carbon heater. A temperature was raised to 1450° C. in an argon gas atmosphere (pressure: 0.025 MPaG), and heating was performed for three hours at a heating temperature of 1450° C. (annealing step). After heating, a lump in which particles are loosely aggregated in the container was crushed by using a mortar, and the resultant crushed objects were caused to pass through a sieve having an opening of 250 μm, thereby obtaining a powder.

Next, the obtained powder was added to a mixed acid (obtained by mixing hydrofluoric acid and nitric acid in a volume ratio of 1:1) of hydrofluoric acid (concentration: 50% by mass) and nitric acid (concentration: 70% by mass), the resultant solution was subjected to an acid treatment for 30 minutes while being stirred at a temperature of 75° C. After the acid treatment, stirring was terminated and the powder was allowed to precipitate, thereby removing a supernatant and a fine powder refined with the acid treatment. Then, distilled water was further added to the powder, and stirring was performed again. The stirring was terminated, a powder was allowed to precipitate, and a supernatant and a fine powder were removed. This operation was repeated until pH of the aqueous solution is 8 or less and the supernatant becomes transparent, and the resultant precipitate was filtered and dried, thereby obtaining a europium activating β-type sialon phosphor.

Comparative Example II-2

A europium activating β-type sialon phosphor was obtained in a similar manner as in Comparative Example II-1 except that in the annealing step, the mixture was adjusted so that the blending amount of cerium oxide becomes 0.1% by mass with respect to the total amount of the first sintered body and the cerium oxide, that is, 100% by mass, and then the mixture was heated in an argon gas atmosphere.

Comparative Example II-3

A europium activating β-type sialon phosphor was obtained in a similar manner as in Comparative Example II-1 except that in the annealing step, the mixture was adjusted so that the blending amount of the cerium oxide becomes 0.5% by mass with respect to the total amount of the first sintered body and the cerium oxide, that is, 100% by mass, and then the mixture was heated in an argon gas atmosphere.

Comparative Example II-4

A europium activating β-type sialon phosphor was obtained in a similar manner as in Comparative Example II-1 except that in the annealing step, the mixture was adjusted so that the blending amount of lanthanum oxide becomes 0.1% by mass with respect to the total amount of the first sintered body and the lanthanum oxide, that is, 100% by mass, and then the mixture was heated in an argon gas atmosphere.

Comparative Example II-5

A europium activating β-type sialon phosphor was obtained in a similar manner as in Comparative Example II-1 except that in the annealing step, the mixture was adjusted so that the blending amount of lanthanum oxide becomes 0.5% by mass with respect to the total amount of the first sintered body and the lanthanum oxide, that is, 100% by mass, and then the mixture was heated in an argon gas atmosphere.

Example II-1

A europium activating β-type sialon phosphor was obtained in a similar manner as in Comparative Example II-1 except that in the annealing step, the mixture was adjusted so that the blending amount of gadolinium oxide becomes 0.1% by mass with respect to the total amount of the first sintered body and the gadolinium oxide, that is, 100% by mass, and then the mixture was heated in an argon gas atmosphere.

Example II-2

A europium activating β-type sialon phosphor was obtained in a similar manner as in Comparative Example II-1 except that in the annealing step, the mixture was adjusted so that the blending amount of gadolinium oxide becomes 0.5% by mass with respect to the total amount of the first sintered body and the gadolinium oxide, that is, 100% by mass, and then the mixture was heated in an argon gas atmosphere.

Example II-3

A europium activating β-type sialon phosphor was obtained in a similar manner as in Comparative Example II-1 except that in the annealing step, the mixture was adjusted so that the blending amount of gadolinium oxide becomes 1% by mass with respect to the total amount of the first sintered body and the gadolinium oxide, that is, 100% by mass, and then the mixture was heated in an argon gas atmosphere.

Comparative Example II-6

A europium activating β-type sialon phosphor was obtained in a similar manner as in Comparative Example II-1 except that in the annealing step, the mixture was adjusted so that the blending amount of gadolinium oxide becomes 5% by mass with respect to the total amount of the first sintered body and the gadolinium oxide, that is, 100% by mass, and then the mixture was heated in an argon gas atmosphere.

Comparative Example II-7

A standard sample (manufactured by Sialon co., Ltd., NIMS Standard Green lot No. NSG 1301) of the β-type sialon phosphor was set as a phosphor of Comparative Example 11-7.

<Measurement of Contents of Gadolinium, Cerium, and Lanthanum>

With respect to the europium activating β-type sialon phosphors prepared in Examples II-1 to II-3, and Comparative Examples II-1 to II-7, the content of each of gadolinium, cerium, and lanthanum was measured by the following method. Results are shown in Table 2.

<Contents of Gadolinium, Cerium, and Lanthanum>

The content of each of gadolinium, cerium, and lanthanum in the europium activating β-type sialon phosphors was measured in the following order. Each of the phosphors was dissolved by a pressurized acid decomposition method, thereby preparing a sample solution. With respect to the obtained sample solution, quantitative analysis of elements was performed by using ICP emission spectrophotometer (manufactured by Rigaku Corporation, product name: CIROS-120). Note that, a detection lower limit of each of gadolinium (Gd), cerium (Ce), and lanthanum (La) was 100 ppb.

[Evaluation of Europium Activating β-Type Sialon Phosphor]

With respect to each of the europium activating β-type sialon phosphors prepared in Examples I-1 to II-3, and Comparative Examples II-1 to II-7, an absorptance, internal quantum efficiency, external quantum efficiency, chromaticity X, and chromaticity Y in a case of irradiation with excitation light with a wavelength of 455 nm, and an absorptance in a case of irradiation with excitation light with a wavelength of 600 nm were evaluated by a method to be described later. Results are shown in Table 2.

<Absorptance, Internal Quantum Efficiency, and External Quantum Efficiency>

The absorptance (excitation light absorptance), the internal quantum efficiency, and the external quantum efficiency of the phosphor in a case of irradiation with excitation light with a wavelength of 455 nm were calculated in the following order. First, a phosphor that is a measurement target was filled in a concave cell in a smooth surface state, and was attached to an opening of an integrating sphere. Monochromatic light divided to a wavelength of 455 nm from an Xe lamp that is a light-emission light source was introduced into the integrating sphere as excitation light of the phosphor by using an optical fiber. The phosphor that is a measurement target was irradiated with the monochromatic light that is excitation light to measure a fluorescent spectrum. In the measurement, a spectrophotometer (manufactured by Otsuka Electronics Co., Ltd., product name: MCPD-7000) was used.

A light emission intensity of the phosphor was determined from obtained fluorescent spectrum data. In addition, the number of photons of reflected excitation light (Qref) and the number of photons of fluorescent light (Qem) were calculated from the obtained fluorescent spectrum data. The number of photons of the reflected excitation light was calculated in the same wavelength range as in the number of photons of excitation light, and the number of photons of fluorescent light was calculated in a range of 465 to 800 nm. In addition, a standard reflective plate (manufactured by Labsphere, Spectralon (registered trademark)) having a reflectance of 99% was attached to the opening of the integrating sphere by using the same device, and a spectrum of excitation light with a wavelength of 455 nm was measured. At this time, the number of photons of excitation light (Qex) was calculated from a spectrum in a wavelength range of 450 to 465 nm.

The absorptance, the internal quantum efficiency, and the external quantum efficiency of the phosphor that is a measurement target with respect to the excitation light with a wavelength of 455 nm were obtained from the above-described calculation results on the basis of the following calculation formulae.

Absorptance of excitation light with a wavelength of 455 nm$=((Qex-\text{Qref})/Qex)\times100$ Internal quantum efficiency$=(Qem/(Qex-\text{Qref}))\times100$ External quantum efficiency$=(Qem/Qex)\times100$ Note that, from the formulae, a relational formula between the external quantum efficiency, the absorptance of the excitation light with a wavelength of 455 nm, and the internal quantum efficiency can be expressed as follows.

External quantum efficiency$=$absorptance of light with a wavelength of 455 nm$\times$internal quantum efficiency <Chromaticity X and Chromaticity Y>

The chromaticity X and the chromaticity Y were obtained by calculating x value (chromaticity X) in CIE chromaticity coordinates and a y value (chromaticity Y) in CIE chromaticity coordinates in an XYZ colorimetric system defined by JIS Z8781-3:2016 from spectrum data of a fluorescent spectrum in a wavelength region within a range of 465 to 780 nm in conformity to JIS Z8724:2015.

<Absorptance of Light with Wavelength of 600 nm>

A standard reflective plate (manufactured by Labsphere, Spectralon (registered trademark)) having a reflectance of 99% was set to a side opening of the integrating sphere. Monochromatic light divided to a wavelength of 600 nm from a light-emission light source (Xe lamp) was introduced to the integrating sphere by an optical fiber, and a spectrum of reflected light was measured by a spectrophotometer (MCPD-7000 manufactured by Otsuka Electronics Co., Ltd.). At this time, the number of photons of incident light (Qex(600)) was calculated from a spectrum in a wavelength range of 590 to 610 nm.

Next, the β-type sialon phosphor was filled in a concave cell in a smooth surface state and was set to an opening of an integrating sphere, and then the phosphor was irradiated with monochromatic light with a wavelength of 600 nm, and a spectrum of reflected incident light was measured by a spectrophotometer. The number of photons of the reflected incident light (Qref(600)) was calculated from obtained spectrum data. The number of photons of the reflected incident light (Qref(600)) was calculated in the same wavelength range as in the number of photons of incident light (Qex(600)). An absorptance of light with a wavelength of 600 nm was calculated from the obtained two kinds of number of photons on the basis of the following formula.

Absorptance of light with a wavelength of 600 nm$=((Qex(600)\text{Qref}(600))/Qex(600))\times100$ Respective measurement values relating to the absorptance, the internal quantum efficiency, the external quantum efficiency, the chromaticity X, and the chromaticity Y of the phosphor may fluctuate when a manufacturer of the measurement device, a manufacturing lot number, or the like is changed. Accordingly, as various measurement values, values measured by a measurement method described in this specification are employed. However, in a case where the manufacturer of the measurement device, the manufacturing lot number, or the like is changed, the respective measurement values may be necessary to be corrected by setting measurement values obtained for a standard sample of the β-type sialon phosphor as reference values. As the standard sample for obtaining the reference values, the standard sample of the β-type sialon phosphor exemplified in Comparative Example II-7 can be used.

TABLE 2

| | Conditions of annealing step | | Phosphor Content of gadolinium | Phosphor Content of cerium | Phosphor Content of lanthanum |
|---|---|---|---|---|---|
| | Atmosphere | Additive | [ppm] | [ppm] | [ppm] |
| Comparative Example II-1 | Ar | — | — | Equal to or less than detection lower limit | Equal to or less than detection lower limit | Equal to or less than detection lower limit |
| Comparative Example II-2 | Ar | CeO$_2$ | 0.1 | Equal to or less than detection lower limit | 2.3 | Equal to or less than detection lower limit |
| Comparative Example II-3 | Ar | CeO$_2$ | 0.5 | Equal to or less than detection lower limit | 43.2 | Equal to or less than detection lower limit |
| Comparative Example II-4 | Ar | La$_2$O$_3$ | 0.1 | Equal to or less than detection lower limit | Equal to or less than detection lower limit | 10.9 |
| Comparative Example II-5 | Ar | La$_2$O$_3$ | 0.5 | Equal to or less than detection lower limit | Equal to or less than detection lower limit | 86.5 |

TABLE 2-continued

| Example II-1 | Ar | Gd$_2$O$_3$ | 0.1 | 9.1 | Equal to or less than detection lower limit | Equal to or less than detection lower limit |
|---|---|---|---|---|---|---|
| Example II-2 | Ar | Gd$_2$O$_3$ | 0.5 | 22.5 | Equal to or less than detection lower limit | Equal to or less than detection lower limit |
| Example II-3 | Ar | Gd$_2$O$_3$ | 1 | 230.6 | Equal to or less than detection lower limit | Equal to or less than detection lower limit |
| Comparative Example II-6 | Ar | Gd$_2$O$_3$ | 5 | 5523.4 | Equal to or less than detection lower limit | Equal to or less than detection lower limit |
| Comparative Example II-7 | — | — | — | Equal to or less than detection lower limit | Equal to or less than detection lower limit | Equal to or less than detection lower limit |

| | Evaluation | | | | | |
|---|---|---|---|---|---|---|
| | Wavelength of excitation light: 455 nm | | | | | Wavelength of excitation light: 600 nm |
| | Absorptance [%] | Internal quantum efficiency [%] | External quantum efficiency [%] | Chromaticity X | Chromaticity Y | Absorptance [%] |
| Comparative Example II-1 | 81 | 78 | 63 | 0.373 | 0.610 | 7.0 |
| Comparative Example II-2 | 81 | 78 | 63 | 0.373 | 0.610 | 6.3 |
| Comparative Example II-3 | 81 | 69 | 55 | 0.368 | 0.614 | 10.2 |
| Comparative Example II-4 | 81 | 75 | 61 | 0.376 | 0.607 | 8.0 |
| Comparative Example II-5 | 81 | 74 | 59 | 0.372 | 0.611 | 6.2 |
| Example II-1 | 81 | 83 | 67 | 0.377 | 0.606 | 5.3 |
| Example II-2 | 80 | 84 | 67 | 0.378 | 0.605 | 4.9 |
| Example II-3 | 80 | 82 | 66 | 0.377 | 0.605 | 5.6 |
| Comparative Example II-6 | 81 | 76 | 62 | 0.374 | 0.609 | 7.1 |
| Comparative Example II-7 | 74 | 75 | 56 | 0.356 | 0.624 | 7.6 |

Comparative Example III-1

[Preparation of Europium Activating β-type Sialon Phosphor]

Respective raw materials were weighed and contained in a container so that silicon nitride (Si$_3$N$_4$) becomes 96.0% by mass, aluminum nitride (AlN) becomes 2.8% by mass, aluminum oxide (Al$_2$O$_3$) becomes 0.5% by mass, and europium oxide (Eu$_2$O$_3$) becomes 0.7% by mass, and the raw materials were mixed by a V-type mixer (manufactured by Tsutsui Scientific Instruments Co., Ltd.) to obtain a mixture. The obtained mixture was caused to pass through a sieve with a mesh size of 250 μm to remove aggregates, thereby obtaining a raw material composition. The aggregates which did not pass through the sieve were pulverized and were caused to pass through the sieve to adjust a particle size.

200 g of raw material composition prepared as described above was weighed and contained in a cylindrical boron nitride container with a lid (manufactured by Denka Company Limited, a molded product containing a boron nitride as a main component (product name: Denka Boron Nitride N-1), inner diameter: 10 cm, height: 10 cm). Then, the container was placed in an electric furnace provided with a carbon heater, a temperature was raised to 2020° C. in a nitrogen gas atmosphere (pressure: 0.90 MPaG), and heating was performed for eight hours at a heating temperature of 2020° C. (sintering step). After heating, a sample that becomes a loosely aggregated lump in the container was crushed by using a mortar. After crushing, the crushed sample was caused to pass through a sieve with a mesh size of 250 μm, thereby obtaining a first sintered body having a powder shape.

Next, a cylindrical boron nitride container was filled with the first sintered body, and the container was placed in an electric furnace provided with a carbon heater. A temperature was raised to 1450° C. in an argon gas atmosphere (pressure: 0.025 MPaG), and heating was performed for three hours at a heating temperature of 1450° C. (annealing step). After heating, a lump in which particles are loosely aggregated in the container was crushed by using a mortar, and the resultant crushed objects were caused to pass through a sieve having an opening of 250 μm, thereby obtaining a powder.

Next, the obtained powder was added to a mixed acid (obtained by mixing hydrofluoric acid and nitric acid in a volume ratio of 1:1) of hydrofluoric acid (concentration: 50% by mass) and nitric acid (concentration: 70% by mass), the resultant solution was subjected to an acid treatment for 30 minutes while being stirred at a temperature of 75° C. After the acid treatment, stirring was terminated and the powder was allowed to precipitate, thereby removing a supernatant and a fine powder refined with the acid treatment. Then, distilled water was further added to the powder, and stirring was performed again. The stirring was terminated and a powder was allowed to precipitate and a supernatant and a fine powder were removed. This operation was repeated until pH of the aqueous solution is 8 or less and the supernatant becomes transparent, and the resultant precipitate was filtered and dried, thereby obtaining a europium activating β-type sialon phosphor.

Example III-1

A europium activating β-type sialon phosphor was obtained in a similar manner as in Comparative Example III-1 except that in the annealing step, the mixture was adjusted so that the blending amount of magnesium oxide becomes 0.1% by mass with respect to the total amount of the first sintered body and the magnesium oxide, that is, 100% by mass, and then the mixture was heated in an argon gas atmosphere.

Example III-2

A europium activating β-type sialon phosphor was obtained in a similar manner as in Comparative Example III-1 except that in the annealing step, the mixture was adjusted so that the blending amount of magnesium oxide becomes 0.5% by mass with respect to the total amount of the first sintered body and the magnesium oxide, that is, 100% by mass, and then the mixture was heated in an argon gas atmosphere.

Example III-3

A europium activating β-type sialon phosphor was obtained in a similar manner as in Comparative Example III-1 except that in the annealing step, the mixture was adjusted so that the blending amount of magnesium oxide becomes 1% by mass with respect to the total amount of the first sintered body and the magnesium oxide, that is, 100% by mass, and then the mixture was heated in an argon gas atmosphere.

Comparative Example III-2

A europium activating β-type sialon phosphor was obtained in a similar manner as in Comparative Example III-1 except that in the annealing step, the mixture was adjusted so that the blending amount of magnesium oxide becomes 5% by mass with respect to the total amount of the first sintered body and the magnesium oxide, that is, 100% by mass, and then the mixture was heated in an argon gas atmosphere.

Example III-4

A europium activating β-type sialon phosphor was obtained in a similar manner as in Comparative Example III-1 except that in the annealing step, the mixture was adjusted so that the blending amount of strontium carbonate becomes 0.1% by mass with respect to the total amount of the first sintered body and the strontium carbonate, that is, 100% by mass, and then the mixture was heated in an argon gas atmosphere.

Example III-5

A europium activating β-type sialon phosphor was obtained in a similar manner as in Comparative Example III-1 except that in the annealing step, the mixture was adjusted so that the blending amount of strontium carbonate becomes 0.5% by mass with respect to the total amount of the first sintered body and the strontium carbonate, that is, 100% by mass, and then the mixture was heated in an argon gas atmosphere.

Example III-6

A europium activating β-type sialon phosphor was obtained in a similar manner as in Comparative Example III-1 except that in the annealing step, the mixture was adjusted so that the blending amount of strontium carbonate becomes 1% by mass with respect to the total amount of the first sintered body and the strontium carbonate, that is, 100% by mass, and then the mixture was heated in an argon gas atmosphere.

Example III-7

A europium activating β-type sialon phosphor was obtained in a similar manner as in Comparative Example III-1 except that in the annealing step, the mixture was adjusted so that the blending amount of strontium carbonate becomes 1.5% by mass with respect to the total amount of the first sintered body and the strontium carbonate, that is, 100% by mass, and then the mixture was heated in an argon gas atmosphere.

Comparative Example III-3

A europium activating β-type sialon phosphor was obtained in a similar manner as in Comparative Example III-1 except that in the annealing step, the mixture was adjusted so that the blending amount of strontium carbonate becomes 5% by mass with respect to the total amount of the first sintered body and the strontium carbonate, that is, 100% by mass, and then the mixture was heated in an argon gas atmosphere.

Comparative Example III-4

A europium activating β-type sialon phosphor was obtained in a similar manner as in Comparative Example III-1 except that in the annealing step, the mixture was adjusted so that the blending amount of lithium carbonate becomes 0.5% by mass with respect to the total amount of the first sintered body and the lithium carbonate, that is, 100% by mass, and then the mixture was heated in an argon gas atmosphere.

Comparative Example III-5

A standard sample (manufactured by Sialon co., Ltd., NIMS Standard Green lot No. NSG 1301) of the β-type sialon phosphor was set as a phosphor of Comparative Example 111-5.

<Measurement of Contents of Alkaline Earth Metal Elements (Magnesium, Strontium, and Lithium)>

With respect to the europium activating β-type sialon phosphors prepared in Examples III-1 to III-7, and Comparative Examples III-1 to III-5, the contents of the alkaline earth metal elements (magnesium, strontium, and lithium) was measured by the following method. Results are shown in Table 3.

<Contents of Magnesium, Strontium, and Lithium>

The content of each of magnesium, strontium, and lithium in the europium activating β-type sialon phosphors was measured in the following order. Each of the phosphors was dissolved by a pressurized acid decomposition method, thereby preparing a sample solution. With respect to the obtained sample solution, quantitative analysis of elements was performed by using ICP emission spectrophotometer (manufactured by Rigaku Corporation, product name: CIROS-120). Note that, a detection lower limit of each of magnesium (Mg), strontium (Sr), and lithium (Li) was 100 ppb.

[Evaluation of Europium Activating β-type Sialon Phosphor]

With respect to each of the europium activating β-type sialon phosphors prepared in Examples III-1 to III-7, and Comparative Examples III-1 to III-5, an absorptance, internal quantum efficiency, chromaticity X, and chromaticity Y in a case of irradiation with excitation light with a wavelength of 455 nm, and an absorptance in a case of irradiation with excitation light with a wavelength of 600 nm were evaluated by a method to be described later. Results are shown in Table 3.

<Absorptance and Internal Quantum Efficiency>

The absorptance (excitation light absorptance) and the internal quantum efficiency of the phosphor in a case of irradiation with excitation light with a wavelength of 455 nm were calculated in the following order. First, a phosphor that is a measurement target was filled in a concave cell in a smooth surface state, and was attached to an opening of an integrating sphere. Monochromatic light divided to a wavelength of 455 nm from an Xe lamp that is a light-emission light source was introduced into the integrating sphere as excitation light of the phosphor by using an optical fiber. The phosphor that is a measurement target was irradiated with the monochromatic light that is excitation light to measure a fluorescent spectrum. In the measurement, a spectrophotometer (manufactured by Otsuka Electronics Co., Ltd., product name: MCPD-7000) was used.

A light emission intensity of the phosphor was determined from obtained fluorescent spectrum data. In addition, the number of photons of reflected excitation light (Qref) and the number of photons of fluorescent light (Qem) were calculated from the obtained fluorescent spectrum data. The number of photons of the reflected excitation light was calculated in the same wavelength range as in the number of photons of excitation light, and the number of photons of fluorescent light was calculated in a range of 465 to 800 nm. In addition, a standard reflective plate (manufactured by Labsphere, Spectralon (registered trademark)) having a reflectance of 99% was attached to the opening of the integrating sphere by using the same device, and a spectrum of excitation light with a wavelength of 455 nm was measured. At this time, the number of photons of excitation light (Qex) was calculated from a spectrum in a wavelength range of 450 to 465 nm.

The absorptance, the internal quantum efficiency, and external quantum efficiency of the phosphor that is a measurement target with respect to the excitation light with a wavelength of 455 nm were obtained from the above-described calculation results on the basis of the following calculation formulae.

Absorptance of excitation light with a wavelength of 455 nm $= ((Qex-\mathrm{Qref})/Qex) \times 100$ Internal quantum efficiency $= (Qem/(Qex-\mathrm{Qref})) \times 100$ External quantum efficiency $= (Qem/Qex) \times 100$ Note that, from the formulae, a relational formula between the external quantum efficiency, the absorptance of the excitation light with a wavelength of 455 nm, and the internal quantum efficiency can be expressed as follows.

External quantum efficiency=absorptance of light with a wavelength of 455 nm×internal quantum efficiency <Chromaticity X and Chromaticity Y>

The chromaticity X and the chromaticity Y were obtained by calculating x value (chromaticity X) in CIE chromaticity coordinates and a y value (chromaticity Y) in CIE chromaticity coordinates in an XYZ colorimetric system defined by JIS Z8781-3:2016 from spectrum data of a fluorescent spectrum in a wavelength region within a range of 465 to 780 nm in conformity to JIS Z8724:2015.

<Absorptance of Light with Wavelength of 600 nm>

A standard reflective plate (manufactured by Labsphere, Spectralon (registered trademark)) having a reflectance of 99% was set to a side opening of the integrating sphere. Monochromatic light divided to a wavelength of 600 nm from a light-emission light source (Xe lamp) was introduced to the integrating sphere by an optical fiber, and a spectrum of reflected light was measured by a spectrophotometer (MCPD-7000 manufactured by Otsuka Electronics Co., Ltd.). At this time, the number of photons of incident light (Qex(600)) was calculated from a spectrum in a wavelength range of 590 to 610 nm.

Next, the β-type sialon phosphor was filled in a concave cell in a smooth surface state and was set to an opening of an integrating sphere, and then the phosphor was irradiated with monochromatic light with a wavelength of 600 nm, and a spectrum of reflected incident light was measured by a spectrophotometer. The number of photons of the reflected incident light (Qref(600)) was calculated from obtained spectrum data. The number of photons of the reflected incident light (Qref(600)) was calculated in the same wavelength range as in the number of photons of incident light (Qex(600)). An absorptance of light with a wavelength of 600 nm was calculated from the obtained two kinds of number of photons on the basis of the following formula.

Absorptance of light with a wavelength of 600 nm= $((Qex(600)-\mathrm{Qref}(600))/Qex(600)) \times 100$ Respective measurement values relating to the absorptance, the internal quantum efficiency, the external quantum efficiency, a peak wavelength and a full width at half maximum of fluorescence, the chromaticity X, and the chromaticity Y of the phosphor may fluctuate when a manufacturer of the measurement device, a manufacturing lot number, or the like is changed. Accordingly, as various measurement values, values measured by a measurement method described in this specification are employed. However, in a case where the manufacturer of the measurement device, the manufacturing lot number, or the like is changed, the respective measurement values may be necessary to be corrected by setting measurement values obtained for a standard sample of the β-type sialon phosphor as reference values. As the standard sample for obtaining the reference values, the standard sample of the β-type sialon phosphor exemplified in Comparative Example 111-5 can be used.

TABLE 3

| | Conditions of annealing step | | | Phosphor Content of magnesium [ppm] | Phosphor Content of strontium [ppm] | Phosphor Content of lithium [ppm] |
|---|---|---|---|---|---|---|
| | Atmosphere | Additive | | | | |
| Comparative Example III-1 | Ar | — | — | Equal to or less than detection lower limit | Equal to or less than detection lower limit | Equal to or less than detection lower limit |
| Example III-1 | Ar | MgO | 0.1 | 0.7 | Equal to or less than detection lower limit | Equal to or less than detection lower limit |
| Example III-2 | Ar | MgO | 0.5 | 1.3 | Equal to or less than detection lower limit | Equal to or less than detection lower limit |
| Example III-3 | Ar | MgO | 1 | 252.3 | Equal to or less than detection lower limit | Equal to or less than detection lower limit |
| Comparative Example III-2 | Ar | MgO | 5 | 1421.5 | Equal to or less than detection lower limit | Equal to or less than detection lower limit |
| Example III-4 | Ar | SrCO$_3$ | 0.1 | Equal to or less than detection lower limit | 4.5 | Equal to or less than detection lower limit |
| Example III-5 | Ar | SrCO$_3$ | 0.5 | Equal to or less than detection lower limit | 6.2 | Equal to or less than detection lower limit |
| Example III-6 | Ar | SrCO$_3$ | 1 | Equal to or less than detection lower limit | 264.2 | Equal to or less than detection lower limit |
| Example III-7 | Ar | SrCO$_3$ | 1.5 | Equal to or less than detection lower limit | 477.7 | Equal to or less than detection lower limit |
| Comparative Example III-3 | Ar | SrCO$_3$ | 5 | Equal to or less than detection lower limit | 1545.4 | Equal to or less than detection lower limit |
| Comparative Example III-4 | Ar | Li$_3$CO$_3$ | 0.5 | Equal to or less than detection lower limit | Equal to or less than detection lower limit | 5.2 |
| Comparative Example III-5 | — | — | — | Equal to or less than detection lower limit | Equal to or less than detection lower limit | Equal to or less than detection lower limit |

| | Evaluation | | | | |
|---|---|---|---|---|---|
| | Wavelength of excitation light: 455 nm | | | | Wavelength of excitation light: 600 nm |
| | Absorptance [%] | Internal quantum efficiency [%] | Chromaticity X | Chromaticity Y | Absorptance [%] |
| Comparative Example III-1 | 81 | 78 | 0.373 | 0.610 | 7.2 |
| Example III-1 | 79 | 80 | 0.368 | 0.614 | 6.1 |
| Example III-2 | 77 | 81 | 0.365 | 0.616 | 5.3 |
| Example III-3 | 74 | 80 | 0.353 | 0.626 | 4.4 |
| Comparative Example III-2 | 20 | 17 | 0.273 | 0.606 | 12.3 |
| Example III-4 | 80 | 81 | 0.371 | 0.611 | 6.5 |
| Example III-5 | 81 | 82 | 0.370 | 0.612 | 5.3 |
| Example III-6 | 80 | 80 | 0.370 | 0.612 | 6.2 |
| Example III-7 | 80 | 80 | 0.368 | 0.614 | 4.3 |
| Comparative Example III-3 | 33 | 25 | 0.301 | 0.609 | 11.5 |
| Comparative Example III-4 | 16 | 8 | 0.289 | 0.608 | 25.1 |
| Comparative Example III-5 | 74 | 75 | 0.356 | 0.624 | 7.6 |

INDUSTRIAL APPLICABILITY

According to the present disclosure, it is possible to provide a europium activating β-type sialon phosphor excellent in internal quantum efficiency.

The invention claimed is:

1. A europium activated β-type sialon phosphor, comprising:
  at least one kind of element selected from the group consisting of yttrium, titanium, and gadolinium,
  wherein a total content of the at least one kind of element is more than 0 ppm and less than 1000 ppm, and
  an absorptance with respect to excitation light with a wavelength of 600 nm is 6% or less.

2. The europium activated β-type sialon phosphor according to claim 1,
  wherein the at least one kind of element is yttrium.

3. The europium activated β-type sialon phosphor according to claim 1,
  wherein the at least one kind of element is titanium.

4. The europium activated β-type sialon phosphor according to claim 1,
  wherein the at least one kind of element is yttrium and titanium.

5. The europium activated β-type sialon phosphor according to claim 1,
  wherein the at least one kind of element comprises at least one of yttrium and titanium, and
  a total content of yttrium and titanium is 0.1 to 500 ppm.

6. The europium activated β-type sialon phosphor according to claim 1,
  wherein the at least one kind of element comprises at least one of yttrium and titanium, and an absorptance with respect to excitation light with a wavelength of 600 nm is 5% or less.

7. The europium activated β-type sialon phosphor according to claim 1, wherein the at least one kind of element is gadolinium.

8. The europium activated β-type sialon phosphor according to claim 7, wherein the content of gadolinium is 0.1 to 300 ppm.

9. A europium activated β-type sialon phosphor, comprising:

an alkaline earth metal element, wherein a total content of the alkaline earth metal element is more than 0 ppm and less than 1000 ppm.

10. The europium activated β-type sialon phosphor according to claim 9, wherein the alkaline earth metal element is magnesium or strontium.

11. The europium activated β-type sialon phosphor according to claim 9, wherein the total content of the alkaline earth metal element is 0.1 to 500 ppm.

12. The europium activated β-type sialon phosphor according to claim 9, wherein an absorptance with respect to excitation light with a wavelength of 600 nm is 7% or less.

13. A light-emitting device, comprising:

a light-emitting element that emits primary light; and a wavelength converting body that absorbs a part of the primary light and emits secondary light with a wavelength longer than the wavelength of the primary light, wherein the wavelength converting body comprises the europium activated β-type sialon phosphor according to claim 1.

* * * * *